US006353776B1

(12) United States Patent
Röhrl et al.

(10) Patent No.: US 6,353,776 B1

(45) **Date of Patent: *Mar. 5, 2002**

(54) CONTROL SYSTEM AND METHOD FOR CONTROLLING AT LEAST ONE FUNCTION OF AN OBJECT AND ACCESS CONTROL AND DRIVING AUTHORIZATION DEVICE FOR A MOTOR VEHICLE

(75) Inventors: Thomas Röhrl, Barbing; Peter Gold, Sinzing, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/609,507

(22) Filed: Jul. 3, 2000

(30) Foreign Application Priority Data

Jul. 1, 1999 (DE) ........................................ 199 30 460
Mar. 13, 2000 (DE) ........................................ 100 12 110

(51) Int. Cl.[7] ............................ G05D 1/00; G06N 7/00; G08C 17/00; G08C 19/00

(52) U.S. Cl. .............................. 701/1; 701/24; 701/32; 701/33; 701/36; 340/993; 340/995; 340/983; 340/990; 340/426; 340/572.1; 340/825.37; 340/573; 342/450; 342/457; 342/357.1; 342/357.06; 455/73; 455/66; 455/431; 455/422; 375/219; 375/220; 375/221; 370/320; 370/335; 370/342; 370/441

(58) Field of Search ................................ 701/1, 24, 32, 701/33, 36; 340/825.37, 825.49, 825.54, 572.5, 572.8, 539, 572, 573, 426, 990, 993, 995, 988; 455/73, 66, 431, 422; 375/219, 220, 221; 370/320, 335, 342, 441

(56) References Cited

U.S. PATENT DOCUMENTS 5,777,580 A * 7/1998 Janky et al. ................ 342/457
5,787,174 A * 7/1998 Tuttle .......................... 380/23
5,812,065 A * 9/1998 Schrott et al. ......... 340/825.54

(List continued on next page.)

FOREIGN PATENT DOCUMENTS

DE 0 610 902 A2 * 8/1994
DE 44 15 019 C1 * 4/1995
DE 196 15 339 A1 * 10/1997

(List continued on next page.)

*Primary Examiner*—Tan Nguyen
*Assistant Examiner*—Ronnie Mancho
(74) *Attorney, Agent, or Firm*—Herbert L. Lerner; Laurence A. Greenberg; Werner H. Stemer

(57) ABSTRACT

A control system for controlling an object function includes a base station and a portable code transmitter. The base station is at the object and has a transceiver unit for transmitting an interrogation signal. The code transmitter emits a response signal with a code information item in response thereto. The base station checks an authorization of the code information item contained in the response signal. The base station and/or the code transmitter determines a time period between a transmission of a part of the interrogation signal and a reception of a part thereof obtained in reaction thereto, and compares the time period with a predefined reference time period. The base station enables the object-specific function only if the measured time period is shorter than the reference time period even if the code information item of the response signal is correct. There is also provided an access control and driver authorization device for a motor vehicle where the base station transmits the interrogation signal to the code transmitter from which checkbits are transmitted back directly to the motor vehicle, bypassing an evaluation unit. The base station measures the time period between the checkbits being emitted and received back and only accepts a response signal of the code transmitter if the measured time period is shorter than a reference time period. There is also provided a method for controlling at least one function of the object.

11 Claims, 1 Drawing Sheet

U.S. PATENT DOCUMENTS

| | | | | | |
|---|---|---|---|---|---|
| 5,828,693 | A | * | 10/1998 | Mays et al. | 375/202 |
| 5,929,777 | A | * | 7/1999 | Reynolds | 340/825.49 |
| 6,032,127 | A | * | 2/2000 | Schkolnick et al. | 705/23 |
| 6,181,253 | B1 | * | 1/2001 | Escheubach et al. | 340/825.37 |
| 6,184,801 | B1 | * | 2/2001 | Janky | 340/988 |
| 6,239,690 | B1 | * | 5/2001 | Burbidge et al. | 340/10.33 |
| 6,249,227 | B1 | * | 6/2001 | Brady et al. | 340/572.1 |
| 6,252,544 | B1 | * | 6/2001 | Hoffberg | 342/357.1 |

FOREIGN PATENT DOCUMENTS

| | | | | |
|---|---|---|---|---|
| DE | 196 42 017 | C1 | * | 4/1998 |
| DE | 196 32 025 | C2 | * | 7/1998 |

* cited by examiner

CONTROL SYSTEM AND METHOD FOR CONTROLLING AT LEAST ONE FUNCTION OF AN OBJECT AND ACCESS CONTROL AND DRIVING AUTHORIZATION DEVICE FOR A MOTOR VEHICLE

BACKGROUND OF THE INVENTION

Field of the Invention

The invention relates to a control system and method for controlling at least one function of an object, in which measures for preventing an unauthorized use or access to the object are taken. The invention also relates to an access control and driving authorization device for a motor vehicle.

Access control systems, immobilizer systems, or other control systems whose functions are enabled or controlled only when there is proven authorization of a code transmitter, for example, in the form of a Smart Card or an electronic key that is interrogated by wireless communication, are known for motor vehicles. See, for example, U.S. Pat. No. 4,763,121 to Tomoda et al. Usually, to accomplish this purpose, at least one base station with a transceiver unit, i.e., for controlling the access control or the immobilizer device, is disposed on or in the motor vehicle. In reaction to a triggering event, for example, the activation of a door handle or an ignition starter knob, an interrogation code signal is emitted at regular or irregular intervals. An authorized code transmitter, carried by the user and serving as a key, responds to the interrogation code signal with a response code signal. Such communication is also referred to as an interrogation/response dialog.

The base station checks the received response code signal in terms of its authorization, for example, by comparing a code information item contained in the response code signal with a stored reference code information item. If authorization is given, the desired function is carried out, for example, the motor vehicle doors are unlocked or the immobilizer is released.

In such a system, there may also be security problems, for example, as a result of unauthorized monitoring and deliberate modification of the wireless communication between the motor vehicle and the code transmitter. To solve these problems, there exists a device for controlling functions of an object, in particular, the access and driving authorization control for a motor vehicle. See, i.e., German Patent DE 196 32 025 C2. In the device, the length of the communication of the interrogation/response dialog is measured and is compared with a predefined maximum duration. However, the signal propagation times are very short in comparison with the computing times, with the result that prolonged signal propagation times are not evident. Therefore, the signal propagation times cannot be used as a protection against deliberate data modification by unauthorized parties.

SUMMARY OF THE INVENTION

It is accordingly an object of the invention to provide a control system and method for controlling at least one function of an object and access control and driving authorization device for a motor vehicle that overcomes the hereinafore-mentioned disadvantages of the heretofore-known devices and methods of this general type and that has an increased level of protection against unauthorized attempts at use, without requiring considerable interventions into the system, and that provides an improvement in comparison with unauthorized execution of the associated function.

With the foregoing and other objects in view, there is provided, in accordance with the invention, a control system for controlling at least one function of an object, including a base station disposed at an object and having a transceiver unit with a transmitter unit formed to transmit an interrogation signal, a portable code transmitter formed to emit a response signal with a code information item in response to the interrogation signal, the base station checking an authorization of the code information item contained in the response signal and, in the case of an authorized response signal, the base station enabling an object-specific function, at least one of the base station and the code transmitter determining a time period between a transmission of at least one part of the interrogation signal and a reception of a part of the interrogation signal obtained in reaction to the interrogation signal, and comparing the time period with a predefined reference time period, the base station enabling the object-specific function only if the measured time period is shorter than the reference time period even if the code information item of the response signal is correct, an evaluation circuit in at least one of the code transmitter and the base station for evaluating the code information item, a transmitter antenna, and a bypass path through which parts of the interrogation signal are routed to the transmitter antenna, the bypass path bypassing the evaluation circuit.

In the invention, the time period between the transmission of marked parts of a transmit signal and the reception of these parts is determined in one of the units involved. For example, the system reaction time is measured in order to determine the distance between the code transmitter and the base station disposed at the object end. The measurement is preferably carried out in the base station for reasons associated with power technology, logic, or the system, but depending on the system configuration the code transmitter can also perform it.

When there is an unauthorized remote interrogation, the very much longer signal paths and the internal processing times of the intermediately connected signal amplifiers result in significantly longer processing times than in the case of an authorized code transmitter that is located near to the motor vehicle, and, thus, longer delays between the emission of the signal and the reception of the response signal. In such a case, the evaluation circuit measures the time period between the emission of the signal and the reception of at least one or more marked sections or parts of the signals, and compares these time periods. In the simplest case, the time period is compared with a previously defined reference time period that is sufficient for the signal to be received back from an authorized code transmitter located near to the motor vehicle, but is usually exceeded in the case of an unauthorized remote interrogation due to the above mentioned influences.

The base station is configured according to the invention such that it executes or enables the desired function only if at least the particularly characterized parts of the signals have been received within the predefined time period.

In order to eliminate internal time delays that are due to the system and cannot be calculated precisely—especially long time delays—and which are caused by the processing operations, necessary at the receiver end (for example, code transmitter end), which relate to the reception of an interrogation signal, the detection and evaluation of the interrogation signal, the generation/calculation of a response signal and its emission, the system component which generates the response signal (here the code transmitter) is preferably equipped with a bypass path through which at least a marked part of the received signal can be conducted directly to the transmitter (transmitting amplifier and/or antenna), bypassing the system component's own evaluation circuit, and thus transmitted back, virtually without delay, to the component that transmitted the signal.

The appropriate parts are reflected without delay, apart from the short group delay (transparent mode of the code transmitter). The delay between the emission and reception of a signal is then essentially only conditioned by propagation time so that a distance measurement takes place between the base station and the code transmitter. Additional analog or digital processing of the original signal would entail additional processing times that would be significantly longer than the signal propagation time in free space.

In accordance with another feature of the invention, there is provided at least one switch disposed in the bypass path and formed to selectively disconnect and connect the bypass path into the evaluation circuit.

The bypass path is preferably provided with a controllable switch so that the bypass path causes parts of the received signal to be forwarded directly to the transmitter only on a temporary basis, but can otherwise be switched off. Thus, it does not adversely affect the signal communication (and the energy content) of the received signal.

In accordance with a further feature of the invention, at least one of the code transmitter and the base station is formed to apply the received interrogation signal at least temporarily to the evaluation circuit and to the bypass path in parallel.

In accordance with an added feature of the invention, the evaluation circuit is formed to add an additional signal to signals conducted to the transmitter antenna through the bypass path.

In accordance with an additional feature of the invention, at least one of the base station and the code transmitter are formed to emit at least one pulse transmitted back to the transmitter unit through the bypass path and the transmitter antenna.

If the component that is equipped with the bypass path applies the received signal not only to the bypass path but also at the same time to its own evaluation circuit, the evaluation circuit can check the received signal to determine whether or not the code that is intended for the respective component is correct. If the code (or code information) is correct, the evaluation circuit can add on an additional signal, for example, a pulse or a pulse sequence, to the signal that has been conducted through the bypass path and transmitted. The configuration permits, to an even greater extent, the protection against deliberate data modification, for example, against the use of falsified transponders.

In accordance with yet another feature of the invention, at least one of the base station and the code transmitter is formed to emit at least one of a pulse and a code sequence and to modulate at least one of an amplitude, a pulse length, and a frequency of the at least one of a pulse and a code sequence, and the evaluation circuit is formed to measure a time period between an emission and a reception of the at least one pulse and code sequence, and to check at least one of the amplitude, the pulse length and the frequency of the at least one pulse and code sequence.

In accordance with yet a further feature of the invention, at least one of the base station and the code transmitter is formed to be configured for a plurality of at least one of frequency bands and a plurality of channels within a frequency band, and is formed to change a transmission frequency respectively being used.

In the multichannel mode of operation, or when there are generally a plurality of transmission paths between the motor vehicle and the identification component (code transmitter or transponder 1), the mode of operation described above can also be carried out simultaneously with the actual exchange of code. The simultaneous operation makes deliberate data modification even more difficult.

The component that generates the interrogation code signal preferably generates the additional pulse or pulses or else the interrogation code signal with a field strength, pulse length, frequency, sequence, pulse duty factor that changes from pulse to pulse or signal to signal. When the pulses are conducted through via the bypass path, the information arrives back, in addition to the component that generates the interrogation code signal, in the form of corresponding differences in field strength, pulse length, or frequency, so that an additional security parameter is made available, the security parameter is evaluated by the component generating the interrogation code signal by comparing the received profile of the field strength, pulse length, or frequency with the anticipated profile. In the case of remote transmission, it is virtually impossible to produce these parameters precisely so that deviations of the received profile from the actually expected profile constitute an additional indication of unauthorized vehicle use.

If a plurality of transmission channels/frequency bands is present, an additional increase in security in comparison with unauthorized access or use can be achieved by changing the transmission frequencies used. During the vehicle locking operation, the transmitter unit can, for example, feed to the code transmitter an item of information that signals the transmission frequency that is to be used during the following opening or starting operation, and the code transmitter then sets itself to that frequency. Therefore, during a subsequent opening operation, the transmitter of the code transmitter is set to the correct frequency. Such setting allows the pulses that are conducted through the bypass path to be conducted back on the correct frequency or the correct channel virtually without delay and without transient response processes or the like.

To the extent that the response code signal obtained from the remotely disposed code transmitter can at all be transmitted correctly over the remote interrogation path, the response code signal is still generated with a considerable time delay. Based upon the considerable time delay, the base station can clearly distinguish between a signal transmitted back by a code transmitter that is in situ and a signal that has been fed by unauthorized remote interrogation. Unauthorized remote interrogation can be performed, for example, by predefining, again, a time window for the response signal that has already closed when the response signal, that is fed severely delayed or distorted over the remote interrogation path, is received. Such results in a rejection of the response signal because it has arrived with too great a delay.

Instead of the transmission frequency being predefined as the next parameter to be selected, a different signal parameter, for example, the amplitude, method of modulation, or the like can also be set by the base station.

In the invention, increased signal propagation times between the base station and remotely disposed code transmitters are used to distinguish between a code transmitter that is located in situ, i.e., near to the motor vehicle, and a remotely disposed code transmitter, which is thus interrogated without authorization, and to execute or enable the function of the vehicle only if the code transmitter is an authorized one that is located in the vicinity of the vehicle.

The invention can generally be used not only in controlling the access control function or immobilizer function, but also in other functions that are to be executed only when an authorized key is present. The invention can generally be used in the authorization-related control of object functions that do not relate to motor vehicles, for example, access control to houses, apartments, offices, hotels, multistory car parks, garages, and the like.

To implement the invention in the simplest case, all that is required is for a time window function to be added to the base station by programming (the time period between the emission and reception of parts of signals is measured and the recorded time period is compared with a predefined time value). When a bypass path is added to the code transmitter, all that is necessary is to configure the code transmitters appropriately, which does not involve a large amount of work or high cost. Thus, the invention can be implemented easily and cost-effectively without the necessity for high levels of system intervention, and can be applied in different system configurations without any disadvantages occurring during use, including driving mode (for example, in respect of reaction times, operating reliability, etc.).

With the objects of the invention in view, there is also provided a method for controlling at least one function of an object, including the steps of carrying out an authorization check between a portable code transmitter and a base station disposed at an object by transmitting, through a transmitter, an interrogation signal in at least one pulse modified in at least one of amplitude, pulse length, and frequency, receiving the interrogation signal through a receiver having a transmitter circuit, the receiver conducting the at least one pulse to the transmitter circuit through a bypass path without evaluation processing, transmitting through the transmitter circuit the at least one pulse and a response signal containing a code information item, receiving the at least one modified pulse and the response signal, measuring a time period between an emission of at least one part of the interrogation signal and a reception of a part of the response signal obtained in reaction to the interrogation signal, comparing the time period with a predefined reference time period, determining whether or not the code information item contained in the response signal is an authorized code information item, and enabling or carrying out a function only if the authorized code information item is determined to have been received and if the measured time period lies within the predefined reference time period.

In accordance with yet an added mode of the invention, there are provided the steps of evaluating within the response signal at least one of parts of the interrogation signal conducted through the bypass path, a length of the parts of the interrogation signal conducted through the bypass path, and a position of the parts of the interrogation signal conducted through the bypass path, and comparing the parts of, the length of the parts of, and the position of the parts of the interrogation signal conducted through the bypass path with anticipated values.

With the objects of the invention in view, there is also provided a method for controlling at least one function of an object, including the steps of carrying out an authorization check between a portable code transmitter having a portable receiver, a bypass path, and a transmitter circuit, and a base station disposed at an object, the base station having a base station transmitter, a base station receiver, and a control unit, by transmitting, through the base station transmitter, an interrogation signal in at least one pulse modified in at least one of amplitude, pulse length, and frequency, receiving the interrogation signal through the portable receiver, the portable receiver conducting the at least one pulse to the transmitter circuit through the bypass path without evaluation processing, transmitting through the transmitter circuit the at least one pulse and a response signal containing a code information item, receiving with the base station receiver the at least one modified pulse and the response signal, measuring with the control unit a time period between an emission of at least one part of the interrogation signal and a reception of a part of the response signal obtained in reaction to the interrogation signal, comparing with the control unit the time period with a predefined reference time period, determining with the control unit whether or not the code information item contained in the response signal is an authorized code information item, and at least one of enabling or carrying out a function with the control unit only if the authorized code information item is determined to have been received and if the measured time period lies within the predefined reference time period.

In accordance with a concomitant feature of the invention, there is also provided an access control and driver authorization device for a motor vehicle, including a base station disposed at a motor vehicle and having a transceiver unit formed to emit an interrogation signal and to subsequently wait for and receive a response signal, the transceiver unit having a control unit with an evaluation unit and a timer device formed to evaluate respectively the response signal for authorization and signal propagation time, and a portable code transmitter having a receiver formed to receive the interrogation signal, an arithmetic unit, a bypass path, a transmitter formed to transmit the response signal after the interrogation signal has been received, and a switching device formed to switchably connect the transmitter to the receiver through at least one of the arithmetic unit and the bypass path and formed to conduct predefined parts of the received interrogation signal directly from the receiver to the transmitter through the bypass path and to conduct a remainder of the request signal to the transmitter through the arithmetic unit, such that, when authorization is confirmed by the control unit and the signal propagation time is confirmed by the control unit, the base station performs at least one of permitting access to the motor vehicle and releasing a motor vehicle immobilizer.

Other features that are considered as characteristic for the invention are set forth in the appended claims.

Although the invention is illustrated and described herein as embodied in a control system and method for controlling at least one function of an object and access control and driving authorization device for a motor vehicle, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 2:
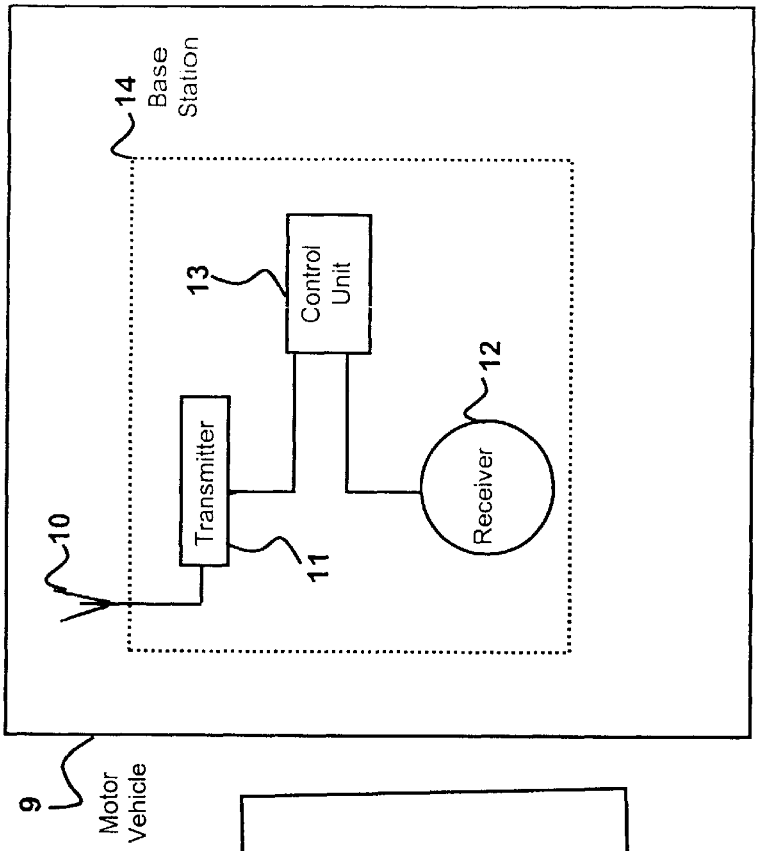
FIG. 2 is a schematic block diagram of an object for which measures for preventing an unauthorized use or access thereto are taken according to the invention.

The invention is explained in more detail below by the exemplary embodiment of an access control and driving authorization device for a motor vehicle. However, the invention can be used not only in a motor vehicle but also in other objects in which authorization has to be proven in order to control object-specific functions, such as access to the object.

In all the figures of the drawing, sub-features and integral parts that correspond to one another bear the same reference symbol in each case.

Figure 1:
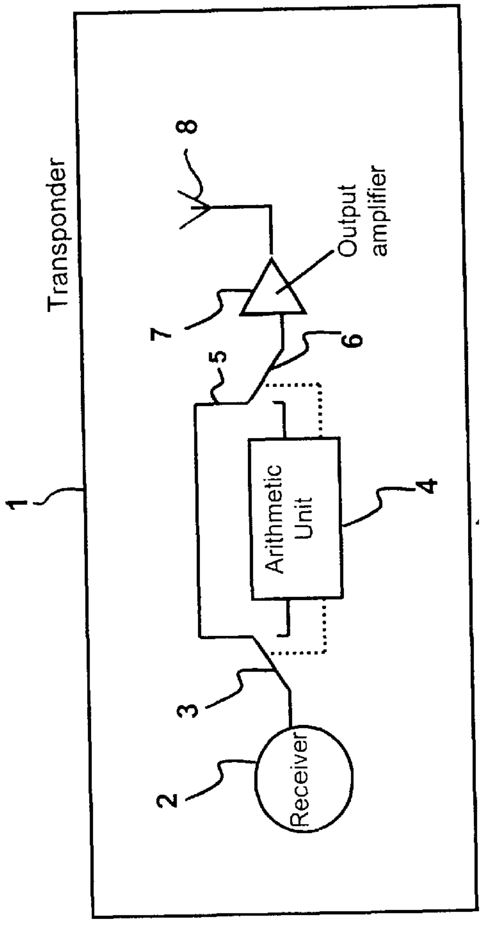
FIG. 1 is a schematic block diagram of a transponder according to the invention.

Referring now to the figures of the drawings in detail and first, particularly to FIG. 1 thereof, there is shown a control system for a motor vehicle. The control system has a portable code transmitter or an electronic "key" with a transmitter 7, 8 and a receiver 2. The code transmitter can be a card (i.e., a smart card or the like) and is used as an identification transmitter that automatically transmits back a response code signal after a request signal has been received. For this reason, the code transmitter is referred to below as a transponder 1. The response code signal contains a binary code information item that is modulated onto a carrier frequency and is characteristic of the transponder 1.

The transponder 1 has a schematically illustrated receiving circuit with the receiver 2 that acquires high frequency signals through an antenna 8 and outputs them, if appropriate after demodulation, to an arithmetic unit (controller) 4. The arithmetic unit (controller) 4 processes the received and demodulated interrogation code signal, in particular decodes it, and determines whether the interrogation code signal directed at the transponder 1 is that of a control device (base station 14) permanently mounted at the vehicle. If such is the case, the arithmetic unit 4 generates, using the response code signal and/or stored information and/or a mathematical algorithm, a code information item that is modulated onto a carrier frequency with an output amplifier/modulator 7 and is emitted as a response code signal through an antenna 8.

The signal processing in the arithmetic unit 4 requires a time period that is significantly longer than the signal propagation times between the base station 14 and transponder 1 that occur during the wireless transmission of signals. The transponder 1 has a bypass path 5 (bypassing the arithmetic unit 4 in the form of a continuous line in FIG. 1). The receiver 2 is directly connected to the output amplifier 7 through the bypass path 5 so that only the pure signal propagation times for the wireless transmission are measured for determining a distance between the transponder 1 and the base station 14.

One controllable switch 3 or 6 is disposed respectively at each of the input and the output of the arithmetic unit 4. The switches 3, 6, allow the switch over to the bypass path when required. Specifically, the receiving circuit 2 is connected by the switch 3 either to the input of the arithmetic unit 4 or to the bypass path 5, whereas the switch 6 connects the input of the output amplifier 7 either to the bypass path 5 or to the output of the arithmetic unit 4. The switches 3, 6 are preferably embodied as semiconductor switches and are synchronously controlled by the arithmetic unit 4 such that they are either located in the position shown or are connected to the input and output of the arithmetic unit 4.

In a modified exemplary embodiment, the receiving circuit 2 can also be connected permanently to the input of the arithmetic unit 4. The switch 3 can then be eliminated entirely or may be disposed such that it either connects the bypass path 5 to the connecting line between the receiving circuit 2 and the arithmetic unit 4 or that it selectively disconnects the bypass path 5 from the connecting line. Such a configuration makes it possible, when the bypass path is switched on, to monitor the arithmetic unit 4 continuously, even when the bypass path 5 is switched on (i.e., bypass path 5 and arithmetic unit 4 are then switched on in parallel).

The output of the arithmetic unit 4 can also be permanently connected to the input of the output amplifier 7. Then, the bypass path 5 either can be connected additionally to the input of the output amplifier 7 through the switch 6 or disconnected from it.

The control system of the schematically illustrated motor vehicle 9 contains a transmitter unit 11 that can transmit signals through an antenna 10 provided on the motor vehicle, for example, on the external or internal mirror, and a receiving unit 12 for receiving externally supplied signals, in particular, response code signals of a transponder 1 that is associated with the access control device or the driving authorization device of the motor vehicle. See FIG. 2. The transceiver unit 11, 12 is connected to a control unit 13 for controlling the transmission and the reception of signals, for generating and evaluating signals, and for controlling vehicle-specific functions, for example, a central locking system or an immobilizer system. The transceiver unit 11, 12 and the control unit 13 form the base station 14.

To perform the access control, an activation signal (for example, the activation of the door handle or of another switch on the outside of the motor vehicle) triggers an interrogation code signal that is emitted through the transmitter unit 11 using the antenna 10. If a transponder 1 is present in the environment and receives the interrogation code signal through its receiving circuit 2, the arithmetic unit 4 checks whether or not the signal is actually the interrogation code signal intended for the particular transponder 1. If such is the case, the arithmetic unit 4 generates a defined response code signal that is transmitted back to the receiving unit 12 through the antenna 8.

The response code signal contains an encrypted code information item that is checked for authorization in the base station 14. If the response code signal is authorized, the consideration of the propagation time (described in further detail below) is performed and, if appropriate, access is then granted by releasing door locks.

The same operation occurs to release the immobilizer and start the internal combustion engine. An ignition starter switch is used here as the trigger for the interrogation/response dialog. Thus, the motor vehicle can be used, i.e., the driving mode of operation is enabled. The same operating sequence occurs also when a different vehicle-specific function is controlled, for example, user-specific settings of, for example, the seats or the mirrors, or enabling of the use of a mobile phone or the Internet in a motor vehicle.

The signal propagation time is also taken into account so that functions can be controlled only if the authorized transponder 1 is also disposed in the vicinity of the motor vehicle or in the motor vehicle. To take the signal propagation time into account, the switches 3 and 6 are temporarily switched over such that one or more marked or labeled parts or sections (referred to below as checkbits) of the interrogation code signal are fed directly to the transmitter 7, 8, while at least the remaining parts of the interrogation code signal are fed to the arithmetic unit 4.

The checkbits are one or more bits of a binary (encoded) information item that is present in the interrogation code signal modulated on as a carrier frequency, or that is a binary information item transmitted separately from the interrogation code signal. The checkbits can be transmitted at the start or at the end of the interrogation code signal. They can also be transmitted within the interrogation code signal at one or more previously defined positions. They can also occur repeatedly within the interrogation code signal, and can also do this with a previously fixed number of bits (=length of the checkbits).

The configuration results in an additional "coding" only known by the base station 14 and transponder 1. The coding can change continuously according to a fixed random principle. The base station measures the propagation times of the checkbits, specifically from emission to reception of the checkbits.

The base station 14 is configured such that it records the time of signal emission by the transmitter unit 11, and the time of the reception of a response signal by the receiving unit 12 (in particular, of the checkbits that are relevant to the propagation time). Therefore, real-time measurement takes place in the base station 14, during which the start is determined by the emission of checkbits by the base station 14, and the end is determined by the reception of the corresponding checkbits by the base station 14.

The propagation time of the checkbits, i.e., from the emission by the transmitter unit 11 to the reception by the receiving unit 12 is measured and is compared with a maximum admissible reference propagation time. The functions in the motor vehicle are controlled only if the propagation time of the checkbits lies within the reference propagation time and the code information is authorized.

The reference propagation time is fixed during an initialization phase (for example, when the vehicle is at the end of the production line) such that the propagation time of a signal, that is transmitted to a transponder 1 located at a short, fixed distance from the motor vehicle and is "reflected" directly back by it, is measured. The measured propagation time value (if appropriate, averaged over a plurality of measurements) then has a tolerance value (for example, 50%) added to it. The reference propagation time that is obtained in this manner is much shorter than a propagation time that takes into account the processing time in the arithmetic unit of the transponder 1.

The maximum admissible reference propagation time is measured in a refinement without a bypass path 5 such that a response code signal is not recognized as permissible by a transponder 1 that is at a large distance from the motor vehicle. Therefore, if the response code signal is requested by an unauthorized remote interrogation of the remotely disposed transponder 1, much longer delays are produced. Accordingly, the sum of all the time delays is significantly greater than in the case of a transponder 1 that is located in the vicinity of the motor vehicle, or in the motor vehicle.

In one application for a motor vehicle, the transponder 1 should be at maximum only a few meters away from the motor vehicle. Only then is access possible.

The switches 3, 6 and the bypass path 5 are provided to reduce the time interval between a signal being emitted by the transmitter unit 11 and a response signal being received back from the transponder 1 by the receiving unit 12. Thus, the time delay (for the calculation of the received code and the subsequent generation of the code information for the response code signal) that is caused by the arithmetic unit 4 can be suppressed. A direct transfer of the signal checkbits that are received by the receiving circuit 2 is made possible in the transponder 1 through the bypass path 5 to the output amplifier 7 and to the antenna 8. These checkbits are immediately emitted again by the antenna 8, even if the response code signal is not completely transmitted back until later.

By appropriately setting the switches 3, 6, the direct electrical connection between the receiving circuit or circuits 2 (the number of receiving circuits depending, for example, on the number of channels or frequency bands that can be covered at the identification transmitter end) and the output stage 7, 8 is controlled by the arithmetic unit 4.

Initially, in the home position, the switches 3, 6 are in a switched state in which the input of the arithmetic unit 4 is connected directly to the receiving circuit 2, and the output of the receiving unit 4 is connected to the input of the output amplifier 7. If the base station 14 then emits, through the transmitter unit 11, an interrogation code signal that is directed to the transponder 1, the start of the interrogation code signal is recognized by the arithmetic unit 4. The transponder 1, i.e., the arithmetic unit 4 and its switches 3, 6 that are controlled by the arithmetic unit 4, are synchronized so that they switch into the transparent mode at the correct time when the checkbits arrive and switch back again after the checkbits have arrived.

Because both the base station 14 and the arithmetic unit 4 know the "coding" of the checkbits (for example, respectively stored in a memory, such as an $E^2$PROM or communicated to the receiving unit as coded information), the arithmetic unit can then switch the switches 3, 6 in synchronism with the times predefined by the position and/or length and/or number of the checkbits—starting at the first bit or start bit of the received binary information—so that the checkbits are conducted through the bypass path and immediately transmitted back again. The transponder 1 is then in the transparent mode (during the bypassing process). At least the other parts of the interrogation code signal are fed to the arithmetic unit 4 in order to form the response code signal using the interrogation code signal.

The bypassing method occurs advantageously within an ongoing, possibly encrypted datastream, specifically, within the interrogation code signal and the response code signal. It is then difficult for unauthorized persons to detect where the checkbits are located, how large are the checkbits, and how many checkbits exist.

It is advantageous if the interrogation code signal does not contain any information directly before or directly after the checkbits, so that the switches 3 and 6 have time to switch over appropriately and no information is lost during the switching over process. Such a pulse pause is, in any case, not noticeable because a binary encrypted information item has, in any case continuous pulse pauses and pulses with different lengths. For such a reason, an unauthorized party cannot read the position of the checkbits from the interrogation code signal or the response code signal.

Initially, it is also possible to transmit a start signal that is used to synchronize the arithmetic unit 4. The start signal can have one or more short pulses (pings) that are considered as checkbits and are transmitted back again directly. Then, the actual interrogation code signal can be transmitted, and the response code signal can be generated. The pings can also be transmitted after the interrogation code signal. However, interference with the response code signal may then occur because the pings are emitted without delay and the response code signal is emitted by the transponder 1 with a delay due to the processing time in the arithmetic unit.

The base station 14 determines the time period between the respective checkbits being emitted and received back, and compares this time period with the reference time period.

The arithmetic unit 4 switches the switches 3 and 6 such that the checkbits are conducted through the bypass path 5. The switches 3 and 6 can also be configured such that the checkbits are fed to the arithmetic unit 4 both through the bypass path 5 and parallel to the bypass path 5.

When the response code signal is authorized and the maximum permissible time interval for the back transmission of the checkbit or checkbits is complied with, the base station 14 triggers the desired function, for example, the motor vehicle doors are unlocked or the engine starts.

Alternatively, the control system can also be configured such that the arithmetic unit 4 initially transmits back the response code signal to the base station 14 after the first interrogation code signal has been received. The arithmetic unit 4 only then switches over the switches 3, 6 into the position shown in FIG. 1, after which the base station 14 generates the checkbit or checkbits in order to determine the reaction time until the response pulses are received back. As a further alternative, the arithmetic unit 4 can be permanently introduced between the receiving circuit 2 and output amplifier 7, and the bypass path 5, provided in parallel to the arithmetic unit 4, can be connected into the circuit or disconnected selectively by at least one switch that is controlled by the arithmetic unit 4. Here, the bypass path 5 can be switched on in the home position so that the pulses or code signals that are emitted by the base station 14 can be processed simultaneously by the arithmetic unit 4 and transmitted back to the base station 14 through the bypass path 5.

Then, the arithmetic unit 4 can be configured such that it generates an additional pulse sequence or an individual pulse, and, for the sake of additional identification confirmation, feeds the latter to the checkbits that are fed through the bypass path 5.

The base station 14 can also be configured such that it varies the field strength, pulse length, or frequency of the emitted checkbits according to a predefined scheme. The "modulation" is maintained in the transponder 1 during the transmission through the bypass path 5, resulting in the pulses that are transmitted back through the output circuit 7, 8 also containing the modulation. In such a case, the base station 14 additionally measures the varied parameters, i.e., the field strength, the pulse length, and/or the change in frequency, and accepts only pulse sequences that change in the anticipated fashion.

It is possible for correction factors that are dependent on field strength also to be transmitted in order to compensate for propagation time differences due to large dynamic differences.

Alternatively, or additionally, a plurality of transmission paths, in particular, a plurality of frequency bands or at least a plurality of channels, may be provided within one frequency band between the base station 14 and the transponder 1. The security measures that are set forth above can then also be carried out simultaneously with the actual exchange of code, making unauthorized deliberate modification of data even more difficult. Thus, the interrogation code signal can be transmitted back with the checkbits, for example, at 125 kHz, and the response code signal and the checkbits can be transmitted back at 433 MHz.

The transponder 1 is constructed, for example, using PLL technology so that the transponder 1 can cover a plurality of frequency bands or at least a plurality of channels within one band at the transmit end. If appropriate, the transponder 1 can have a plurality of output circuits 7, 8 that are configured for different frequencies or channels. The transceiver unit at the motor vehicle end is then also configured for a plurality of frequency bands or a plurality of channels within one band. Such a configuration can be exploited advantageously to the effect that the base station 14 changes the transmit frequency that is respectively being used or the channel that is being used and informs the transponder 1 in advance of which transmit frequency to use or which channel to use, for example, by a corresponding code signal. Such a configuration permits satisfactory communication to be maintained between the base station 14 and the transponder 1.

The base station 14 can make the transmit frequency dependent, for example, upon the respective input code or upon a different code segment, for example, a secret key, so that a continuous frequency change that is dependent, for example, on the bit status or the checksum or the like results. Because only the base station 14 knows the codes, and, thus, the respective new frequency that is to be used, only the connected receiver can follow the correctly timed frequency jump. Therefore, unauthorized monitoring is made more difficult. The proceeding "informing process" can, of course, also apply to the position/length/number of checkbits.

In one embodiment, during a locking operation of the motor vehicle, the base station 14 informs the transponder 1, in the form of a code signal, which frequency will be used when contact is next made, namely during the access control authorization interrogation when an attempt is next made to open a door. The transponder 1 can then be set to the new frequency and transmit on the new frequency during the next communication. However, the frequency that is to be used next remains unknown to remote interrogators that are provided without authorization.

Alternatively, it is also possible for the transponder 1 to actively define the respective frequency to be used and the frequency change, and to inform the base station 14 of the attributes in the form of code signals.

Depending on the configuration of the system, the security measures specified above may be provided independently or in any desired combination.

If the carrier frequencies of the signals are essentially identical, the signal that is conducted through the bypass path 5 and immediately transmitted back can be superimposed with the transmit signal coming from the arithmetic unit 4. This results in interference effects, zero crossing fluctuations, and phase changes and mixed frequencies occurring at the receiving unit 12. They can be registered by the base station 14 (for example, by a phase comparison or evaluation of an interference pattern). Such registration permits even more precise measurement of the delays/propagation times that have occurred, possibly ranging as far as a distance measurement.

The interrogation code signal and the response code signal are code signals that each has a binary information item that is modulated onto a carrier signal. The binary information has a large number of bit positions. As a result of the encryption, the code signal changes with each new encryption process. The code information can be preceded or followed by a plurality of bits that are possibly required for secure data transmission. The code information item is compared with an anticipated reference code information item that is generated at the receive end or is stored.

The term "interrogation code signal" is to be understood in terms of the invention as a signal that contains an encoded information item and the checkbits (even if the checkbits are transmitted earlier or later), and that is used as a request to transmit the response code signal. Likewise, the term "response code signal" is to be understood as a signal that has both a code information item and the checkbits, even if these parts arrive at the respective receiver at different times.

For a concrete exemplary embodiment, it will be assumed that the code information item for the interrogation code signal has 64 bits and is represented by a signal with a frequency of 4 kbit/s (1 bit=250 $\mu$s length or bit length). The code information is modulated onto a carrier signal with the carrier frequency of 125 kHz. Within the code information it will be assumed that three checkbits (corresponding to a time period of approximately 750 μs) are marked, for example, starting with the 20th bit position. The average transmission delay (time period) of the checkbits starting with the emission of the interrogation code signal and ending with the reception of the checkbits that were transmitted back directly by the transponder 1 in transparent mode is assumed to be approximately 20 μs (due to the delay at 125 kHz and 433 MHz) for a transponder 1 disposed near to the motor vehicle. The value 25 μs could be used as reference delay if 5 μs is accepted as the security tolerance. If, therefore, a delay of less than 25 μs is measured for the checkbits, the authorized code information of the transponder 1 is still required in order to execute respectively desired functions in the motor vehicle.

As an additional security measure it is also possible to dispose a plurality of checkbits in the interrogation code signal, for example, a checkbit starting at the 20th bit position with a number of 3 bits, and starting at the 43rd bit position with a number of 2 bits. If the delays of the checkbits are then respectively shorter than the reference delay, and the two lengths of 3 bits and 2 bits can be registered correctly with an appropriate time interval from one another and at the correct time, the response code signal would be recognized as authorized in terms of its checkbits.

The arithmetic unit 4 is advantageously embodied as a microprocessor with associated memories. Likewise, the control unit 13 is embodied as a microprocessor with associated memories. A separate unit that is not illustrated in any further detail can measure the delay. Likewise, the delay can be measured by the microprocessor.

What is claimed is:

1. A control system for controlling at least one function of an object, comprising:

a base station disposed at an object and having a transceiver unit with a base transmitter unit formed to transmit an interrogation signal; and a portable code transponder formed to receive the interrogation signal and to emit a response signal with a code information item and at least part of the interrogation signal in response to the interrogation signal, said transponder having a transmitter antenna a circuit for evaluating the code information item, and a bypass path through which parts of the interrogation signal are routed to said transmitter antenna, said bypass path bypassing said circuit, said base station determining a time period between a transmission of said at least part of the interrogation signal and a reception of said at least part of the interrogation signal obtained in reaction to the interrogation signal, comparing the time period with a predefined reference time period, checking an authorization of the code information item contained in the response signal and, in the case of an authorized response signal, said base station enabling the object-specific function only if the measured time period is shorter than the reference time period even if the code information item of the response signal is correct.

2. The control system according to claim 1, including at least one switch disposed in said bypass path and formed to selectively disconnect and connect said bypass path.

3. The control system according to claim 1, wherein said circuit and said bypass path are in parallel, and said transponder is formed to apply the received interrogation signal to said bypass path and at least temporarily to said circuit.

4. The control system according to claim 1, wherein said circuit is formed to add an additional signal to signals conducted to said transmitter antenna through said bypass path.

5. The control system according to claim 1, wherein said transponder is formed to emit at least one pulse to be transmitted to said base transmitter unit through said bypass path and said transmitter antenna.

6. The control system according to claim 1, wherein said transponder is formed to emit at least one of a pulse and a code sequence and to modulate at least one of an amplitude, a pulse length, and a frequency of the at least one of a pulse and a code sequence, and said circuit is formed to measure a time period between an emission and a reception of the at least one pulse and code sequence, and to check at least one of the amplitude, the pulse length and the frequency of the at least one pulse and code sequence.

7. The control system according to claim 1, wherein at least one of said base station and said code transponder is formed to be configured for a plurality of at least one of frequency bands and a plurality of channels within a frequency band, and is formed to change a transmission frequency respectively being used.

8. A method for controlling at least one function of an object, which comprises:

carrying out an authorization check between a portable code transponder and a base station disposed at an object by:

transmitting, through a transmitter, an interrogation signal in at least one pulse modified in at least one of amplitude, pulse length, and frequency;

receiving the interrogation signal through a receiver having a transmitter circuit, the receiver conducting the at least one pulse to the transmitter circuit through a bypass path without evaluation processing;

transmitting through the transmitter circuit the at least one pulse and a response signal containing a code information item;

receiving the at least one modified pulse and the response signal;

measuring a time period between an emission of at least part of the interrogation signal and a reception of the at least part of the interrogation signal in the response signal obtained in reaction to the interrogation signal;

comparing the time period with a predefined reference time period;

determining whether or not the code information item contained in the response signal is an authorized code information item; and enabling or carrying out a function only if the authorized code information item is determined to have been received and if the measured time period lies within the predefined reference time period.

9. The method according to claim 8, which comprises:

evaluating within the response signal at least one of parts of the interrogation signal conducted through the bypass path, a length of the parts of the interrogation signal conducted through the bypass path, and a position of the parts of the interrogation signal conducted through the bypass path; and comparing the parts of, the length of the parts of, and the position of the parts of the interrogation signal conducted through the bypass path with anticipated values.

10. A method for controlling at least one function of an object, which comprises:

carrying out an authorization check between a portable code transponder having a portable receiver, a bypass path, and a transmitter circuit, and a base station disposed at an object, the base station having a base station transmitter, a base station receiver, and a control unit, by:

transmitting, through the base station transmitter, an interrogation signal in at least one pulse modified in at least one of amplitude, pulse length, and frequency;

receiving the interrogation signal through the portable receiver, the portable receiver conducting the at least one pulse to the transmitter circuit through the bypass path without evaluation processing;

transmitting through the transmitter circuit the at least one pulse and a response signal containing a code information item;

receiving with the base station receiver the at least one modified pulse and the response signal;

measuring with the control unit a time period between an emission of at least part of the interrogation signal and a reception of the at least part of the interrogation signal in the response signal obtained in reaction to the interrogation signal;

comparing with the control unit the time period with a predefined reference time period;

determining with the control unit whether or not the code information item contained in the response signal is an authorized code information item; and at least one of enabling or carrying out a function with the control unit only if the authorized code information item is determined to have been received and if the measured time period lies within the predefined reference time period.

11. An access control and driver authorization device for a motor vehicle, comprising:

a base station disposed at a motor vehicle and having a transceiver unit formed to emit an interrogation signal and to subsequently wait for and receive a response signal, said transceiver unit having a control unit with an evaluation unit and a timer device formed to evaluate respectively the response signal for authorization and signal propagation time;

a portable code transponder having a receiver formed to receive the interrogation signal, an arithmetic unit, a bypass path, a transmitter formed to transmit the response signal after the interrogation signal has been received, and a switching device formed to switchably connect said transmitter to said receiver through at least one of said arithmetic unit and said bypass path and formed to conduct predefined parts of the received interrogation signal directly from said receiver to said transmitter through said bypass path and to conduct a remainder of the request signal to the transmitter through said arithmetic unit, such that, when authorization is confirmed by said control unit and the signal propagation time is confirmed by said control unit, said base station performs at least one of permitting access to the motor vehicle and releasing a motor vehicle immobilizer.

* * * * *